W. T. WHITLOCK.
TIRE FOR VEHICLE WHEELS.
APPLICATION FILED APR. 19, 1911.

1,013,085.

Patented Dec. 26, 1911.

WITNESSES:
H. L. Sprague
Harry W. Bowen.

INVENTOR,
William T. Whitlock,
BY
Chapin &c.
ATTORNEY.

UNITED STATES PATENT OFFICE.

WILLIAM T. WHITLOCK, OF CHICOPEE FALLS, MASSACHUSETTS, ASSIGNOR TO THE FISK RUBBER COMPANY, OF CHICOPEE FALLS, MASSACHUSETTS, A CORPORATION OF DELAWARE.

TIRE FOR VEHICLE-WHEELS.

1,013,085.          Specification of Letters Patent.     Patented Dec. 26, 1911.

Application filed April 19, 1911. Serial No. 622,000.

*To all whom it may concern:*

Be it known that I, WILLIAM T. WHITLOCK, a citizen of the United States of America, residing at Chicopee Falls, in the county of Hampden and State of Massachusetts, have invented new and useful Improvements in Tires for Vehicle-Wheels, of which the following is a specification.

This invention relates to the manufacture of resilient tires for vehicle wheels, and specifically to the surface formation of the tread portion of such tires, the object of the invention being to provide a tire, the tread portion of which is so constructed as to combine improved tractional and anti-skidding qualities and so arranged as to provide means whereby the maximum flexibility of the tire body may be attained, and making provision for the easy shedding of mud or soft earth from the tread surface of the tire.

My invention consists in the features of construction whereby these advantages are obtained and their arrangement with reference to maintaining the desired direction of travel and to the resistance which the tire has to overcome in changing its course or in climbing out of ruts or irregularities in the road. To this end I arrange a series of substantially flat-faced ribs, pads, or projections on the tread surface of the tire in alternation with a like series of depressed spaces or channels separating said ribs.

The invention is clearly illustrated in the accompanying drawing, in which,—

Figure 1:
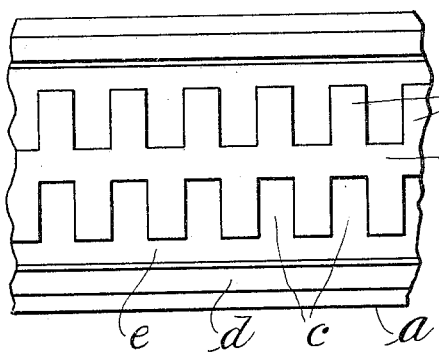
Figure 2:
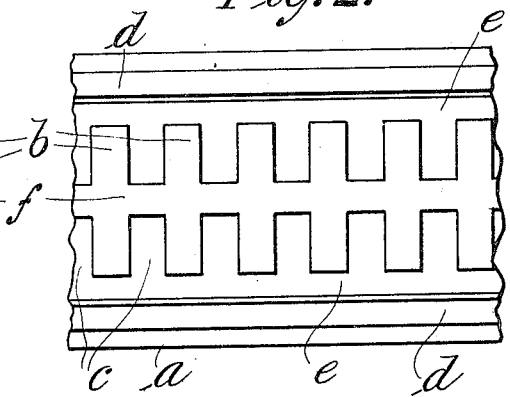
Figure 3:
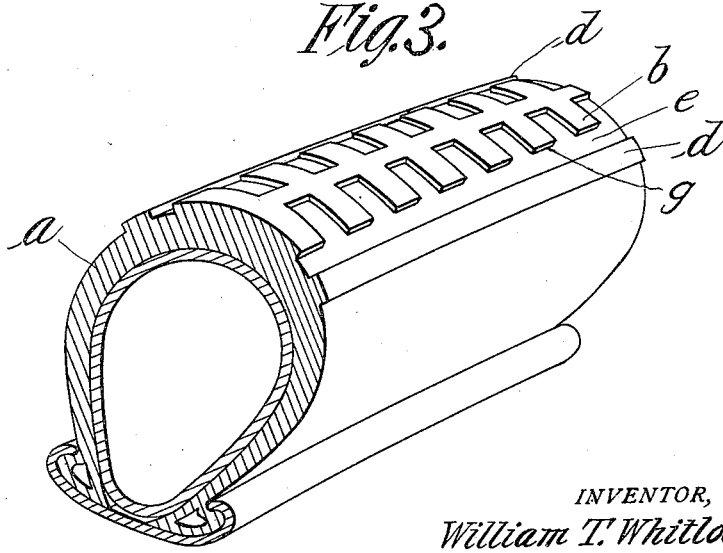

Figure 1 is a plan view of a portion of the tread surface of a tire embodying my invention. Fig. 2 is a view similar to Fig. 1 showing a slightly different arrangement of the tractional ribs or projections. Fig. 3 is a perspective view of a portion of a tire showing the tread surface construction of Fig. 2, this view showing more clearly the relation of the longitudinally disposed ribs and channels relative to the transversely disposed or tractional ribs, and the channels between the latter.

Referring to the drawings, *a* is the tire body, *b* the tractional ribs or projections, *c* the channel between these ribs or projections; *d* indicating the circumferentially disposed ribs or projections equi-distant from the median line of the tire-body and separated from the ends of the tractional projections *b* by the channels *e*. The tractional ribs or projections *b* and their alternating channels *c* are located across the middle of the tread surface of the tire, or over that portion most subject to deflection, and each member of this series of projections extends preferably at a right angle to the direction of rotation of the tire. Each rib, as it is brought into contact with the road surface, gets, as it were, a fresh grip by reason of its protrusion from the surface of the tire body, while each alternating channel space *c* provides a groove into which the road substance may enter thus forming an abutment against which the ribs may act to aid propulsion. The alternating channels *c*, as arranged transversely of the tire, also materially add to the flexibility of the tread portion of the latter and thus diminish frictional resistance in the wall of the tire body.

The circumferentially disposed channels *e* which result from the location of the circumferentially disposed ribs *d* spaced from the outer ends of the ribs *b* is an important feature in that by this arrangement all of the channels are intercommunicating and the circumferentially disposed channels constitute an outlet, as it were, for the transversely disposed channels, whereby the retention of mud or earth in the transverse channels is prevented. Each of the circumferential ribs with its adjacent depressed channel *e* serves to maintain the desired direction of travel and to prevent skidding or slide-slip, in the same manner as the transverse ribs and depressed channels, in getting a grip or hold on the road surface.

The connection of the transverse channels *c* with the circumferential channels, when the tire is subject to side thrusts, allows the road material to compact against the circumferential ribs and assists in checking a disposition to slip sidewise. Such connection of the channels also in straight travel allows mud or soft material relief from undue pressure which would tend to compact it in the transverse channels to such an extent that it would be lifted and thrown as the wheel rotates. The continuity of the surface of the circumferential ribs and their location are of material value in the control of the vehicle on rutted roads, as the edges of these ribs have a prehensile grip on the inclined wall of the ruts which enables the tire to surmount them.

As a matter of convenience in manufacture, the ribs or projections b are united to a narrow rib f located on the median line of the tread surface of the tire, and into which the projections b on either side thereof merge, this rib being of service in supporting the projections or ribs h against tractional thrust, the construction being of greater importance on relatively large size tires than on the smaller ones. The form of tread shown in Figs. 1 and 2 may be made in the same mold, the difference in the position of the ribs b in the two figures being attained by suitable circumferential adjustment of the two parts of the mold. Aside from the resistance to lateral thrust from side slip to which the circumferential ribs d offer resistance, the square faced ends g of the ribs b, and the square inner ends of the channels c, (in the construction shown in Figs. 1 and 2) offer additional areas of resistance to side-slip, the walls of the parts just referred to being substantially radial to the cross-sectional contour of the tire.

What I claim, is:—

In a resilient tire, a circumferential rib located on the median line of the tire, and a rib located on either side thereof equidistant therefrom, all of said ribs being substantially radial to the tread surface of the tire and integral therewith, and traction ribs extending from either side of said central rib, the outer ends of said traction ribs being spaced apart from the ribs on either side of said central rib.

WILLIAM T. WHITLOCK.

Witnesses:
GEORGE A. LUDINGTON,
JOSEPH A. BURKE.

Copies of this patent may be obtained for five cents each, by addressing the "Commissioner of Patents, Washington, D. C."